United States Patent
Rowan et al.

(10) Patent No.: US 6,536,489 B1
(45) Date of Patent: Mar. 25, 2003

(54) PROTECTIVE AND DECORATIVE COVER FOR PORTABLE ELECTRIC GRILL

(76) Inventors: Ophelia Rowan, 4355 Wegdewood Dr., Copley, OH (US) 44321; Ronald R. Rowan, Sr., 4355 Wedgewood Dr., Copley, OH (US) 44321

( * ) Notice: Subject to any disclaimer, the term of this patent is extended or adjusted under 35 U.S.C. 154(b) by 0 days.

(21) Appl. No.: 10/037,046

(22) Filed: Nov. 9, 2001

(51) Int. Cl.⁷ .............................................. B65D 65/02
(52) U.S. Cl. ...................... 150/165; 150/154; D6/610
(58) Field of Search ............................... 150/154, 165; D6/610; 2/209.11, 209.13; 99/646 R; 206/457

(56) References Cited

U.S. PATENT DOCUMENTS

| | | | | |
|---|---|---|---|---|
| 2,432,662 A | * | 12/1947 | Gardner | 150/154 |
| 2,490,250 A | * | 12/1949 | Boener | 150/154 |
| 2,490,451 A | * | 12/1949 | Magid | 150/154 X |
| D184,056 S | * | 12/1958 | Kaye | D6/610 |
| 2,992,668 A | * | 7/1961 | Collard | 150/154 |
| 3,507,312 A | * | 4/1970 | Petersen | 206/457 |
| D229,653 S | * | 12/1973 | Hendrickson | 150/165 X |
| 3,976,046 A | * | 8/1976 | Morton et al. | 126/9 R |
| D246,497 S | | 11/1977 | Toyosawa | D7/205 |
| 4,621,003 A | * | 11/1986 | O'Kane | 428/71 |
| 4,660,307 A | * | 4/1987 | Fay | 150/165 X |
| 4,957,246 A | | 9/1990 | Kantor | 206/390 X |
| 5,325,986 A | * | 7/1994 | Richardson et al. | 150/154 X |
| 5,507,205 A | * | 4/1996 | Ruimi | 74/558 |
| 5,547,734 A | * | 8/1996 | Tusch | 428/102 |
| 5,632,131 A | | 5/1997 | Weder et al. | 53/399 |
| 5,664,975 A | * | 9/1997 | Carlisle | 150/154 X |
| D386,349 S | | 11/1997 | Wysocky et al. | D6/610 |
| 5,724,790 A | | 3/1998 | Weder | 53/399 |
| 5,906,763 A | * | 5/1999 | Wheeler | 206/457 X |
| 5,918,807 A | * | 7/1999 | Doss | 239/1 |
| 5,922,437 A | * | 7/1999 | Bryant | 150/154 X |
| 6,006,743 A | * | 12/1999 | Shimek et al. | 126/512 |
| D424,371 S | | 5/2000 | Dermonte | D7/413 |
| D424,540 S | | 5/2000 | Roth | D14/114 |
| 6,058,658 A | | 5/2000 | Dunn | 52/23 |
| 6,202,638 B1 | | 3/2001 | Didio-Sayer | 126/25 AA |
| 6,262,399 B1 | | 7/2001 | Lau et al. | 219/450.1 |
| 6,328,083 B1 | * | 12/2001 | Esterson et al. | 150/154 |

OTHER PUBLICATIONS

US 2001/0004773 A1 US Patent Application Publication to Moore, dated Jun. 28, 2001 for a Slip–on, Insulating and Decorative Cover for Bicycle Safety Helmets.*

* cited by examiner

*Primary Examiner*—Sue A. Weaver
(74) *Attorney, Agent, or Firm*—John D. Gugliotta; P. Jeff Martin

(57) ABSTRACT

A slip-on, insulating and decorative cover is provided with an overall covering complete with decorative outer aesthetics having one of a variety of designs. The decorative novelty cover is specifically adapted for use with the popular, commercially available GEORGE FOREMAN™ grilling machines. The decorative novelty cover is intended to make a fashion statement along with the additional benefit of keeping the appliance clean.

8 Claims, 6 Drawing Sheets

PROTECTIVE AND DECORATIVE COVER FOR PORTABLE ELECTRIC GRILL

RELATED APPLICATIONS

The present invention was first described in Disclosure Document No. 500,061 filed on Sep. 17, 2001 under 35 U.S.C. §122 and 37 C.F.R. §1.14. There are no previously filed, nor currently any co-pending applications, anywhere in the world.

BACKGROUND OF THE INVENTION

1. Field of the Invention

The present invention relates generally to decorative novelty covers and, more particularly, to a variety of decorative novelty covers adapted for attachment to a portable electric cooking grill.

2. Description of the Related Art

As is well-known in the art, portable electric cooking devices have existed in various sizes, shapes, and styles. Typical of such kitchen appliances is shown in U.S. Pat. No. 6,262,399, but many others are commercially available. Currently popular is a brand sold as GEORGE FOREMAN™ grilling machines manufactured and distributed by Salton, Inc. of prospect, Ill.

Also well known are various types of decorative appliance covers that provide for an aesthetic distraction to the otherwise mechanical design of various kitchen appliances. Covers such as that shown in U.S. Des. 257,712 for general appliances, U.S. Des. 246,497 for irons, U.S. Des. 424,371 for blenders, U.S. Pat. No. 5,724,790 for pots, and U.S. Des. 386,349 for toasters are some such examples. Such a concept has also been extended to other non-kitchen appliances, such as in U.S. Des. 424,540 for computers and U.S. Pat. No. 4,957,246 for toilet paper rolls.

Another problem occurs from the use of covers for cooking appliances due to the heat generated and time necessary to cool to a safe temperature. Attempts at solving this problem are shown in U.S. Pat. No. 6,058,658 and U.S. Pat. No. 6,202,638 for barbeque grills.

Consequently, a need has been felt for providing decorative novelty covers adapted for attachment to a portable electric cooking grill.

SUMMARY OF THE INVENTION

Therefore, it is an object of the present invention to provide an improved decorative novelty cover.

It is a feature of the present invention to provide an improved decorative novelty cover specifically adapted to be used with a portable electric cooking grill.

It is another feature of the present invention to provide a main body retention means which functions to stretch to fit over and contract to fit the contour of a portable electric cooking grill.

It is still another object of the present invention to provide interfacing for making the overall structure slightly stiffer, thereby holding its overall shape.

It is another object of the present invention to provide a device that conforms to the contour of a GEORGE FOREMAN™ grilling machines and the like.

It is another object of the present invention to provide a device that is self-securing.

It is another object of the present invention to provide a device that can be easily slid on and off the GEORGE FOREMAN™ grilling machine.

It is another object of the present invention to provide a device that is washable.

It is another object of the present invention to provide a device that comes in a variety of colors and decorative patterns to suit user's taste and facilitate individuality.

Briefly described according to one embodiment of the present invention, a decorative novelty cover is provided specifically adapted for use with the popular, commercially available GEORGE FOREMAN™ grilling machines. A slip-on, insulating and decorative cover is provided with an overall covering complete with decorative outer aesthetics comprising one of a variety of designs. The invention is intended to make a fashion statement along with the additional benefit of keeping the appliance clean. The decorative cover is readily attached and easily removed to allow for washing of the invention.

The use of the present invention allows one to cover up a conventional GEORGE FOREMAN™ grilling machine to make a fashion statement.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

1. Detailed Description of the Figures

Figure 1:
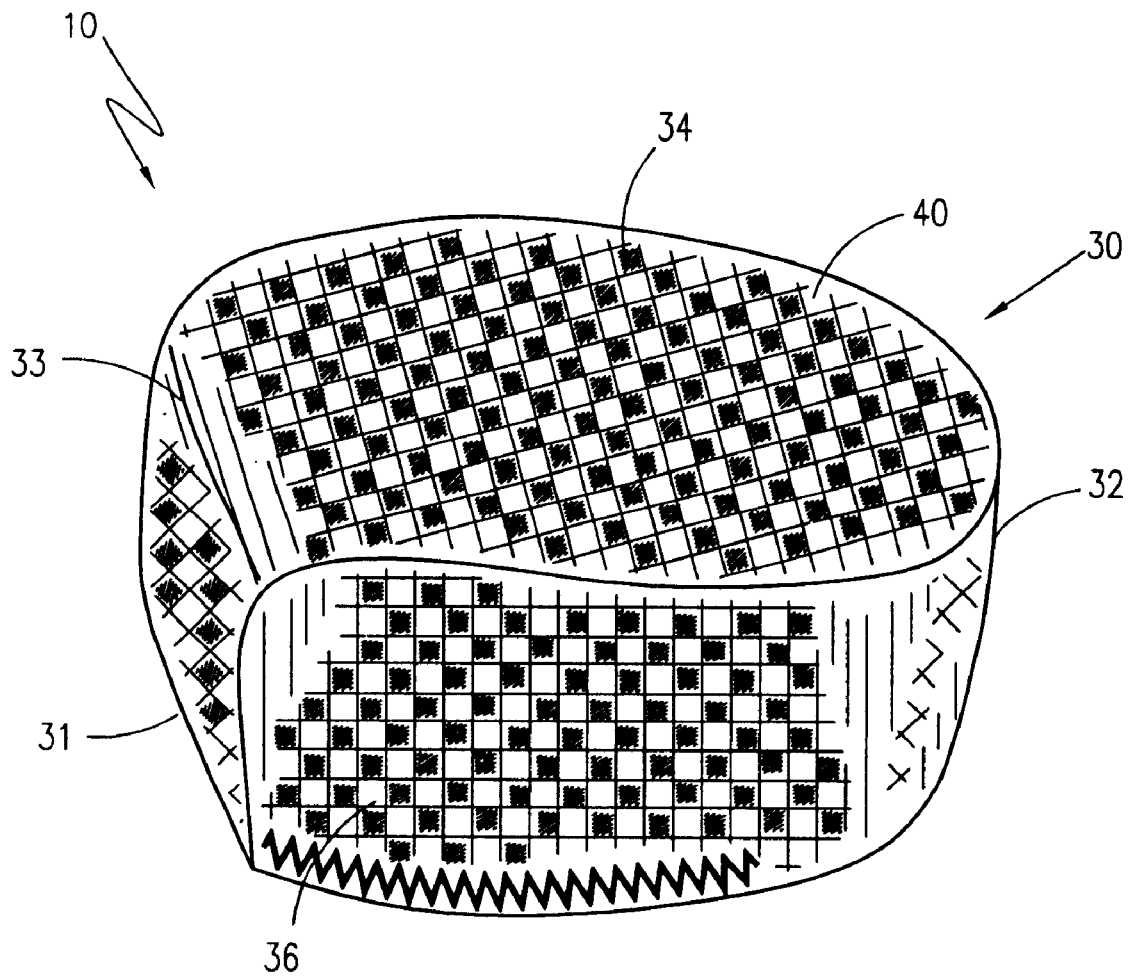
FIG. 1 is a perspective view of the preferred embodiment of the protective and decorative cover for a portable electric grill according to the preferred embodiment of the present invention.
Figure 2:
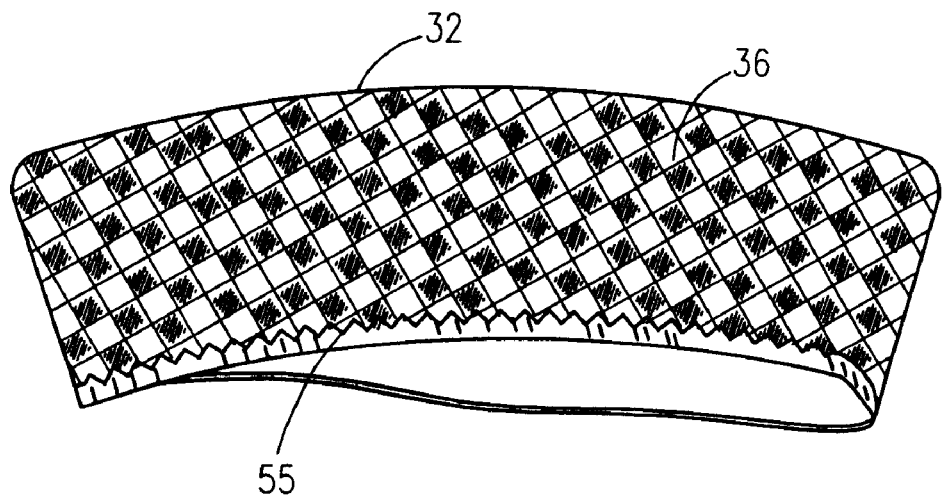
FIG. 2 is a front elevational view thereof.
Figure 3:
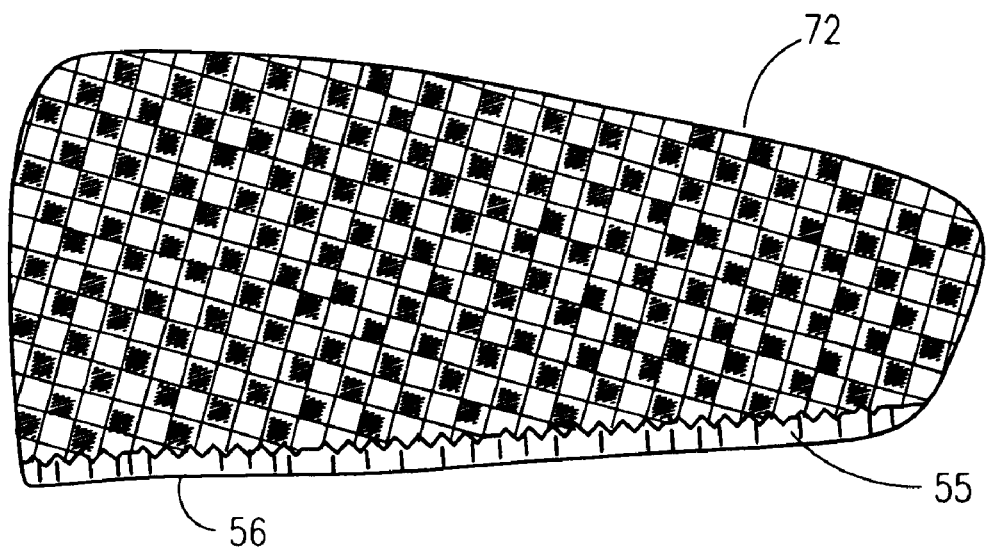
FIG. 3 is a side elevational view thereof.
Figure 4:
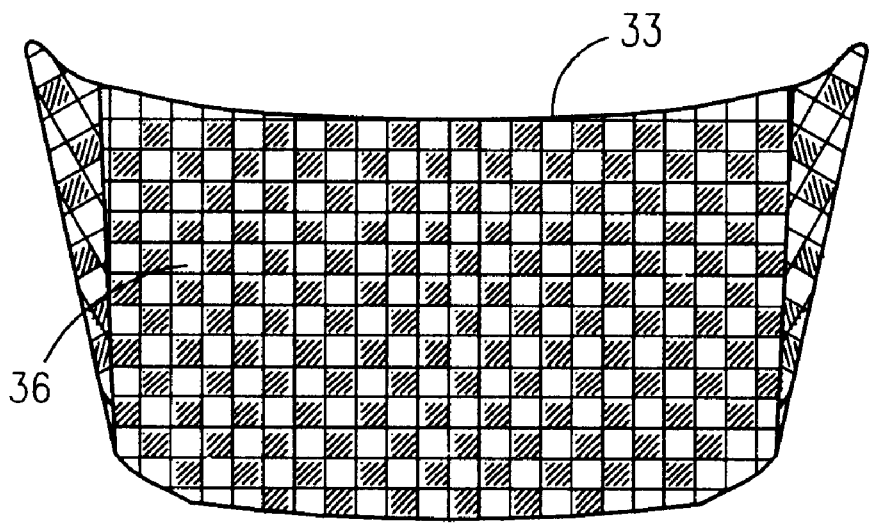
FIG. 4 is a rear elevational view thereof.
Figure 5:
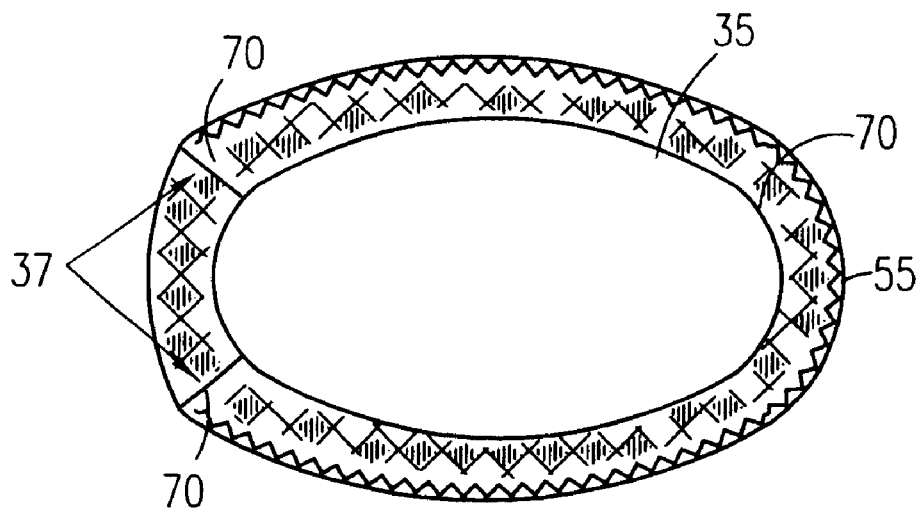
FIG. 5 is a bottom plan view thereof.
Figure 6:
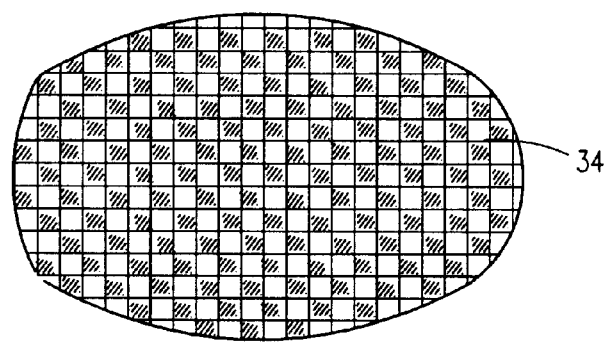
FIG. 6 is a top plan view thereof.
Figure 7:
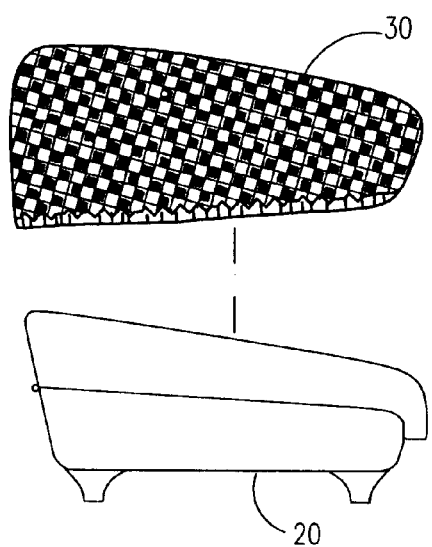
FIG. 7 is an exploded side perspective view thereof.
Figure 8:
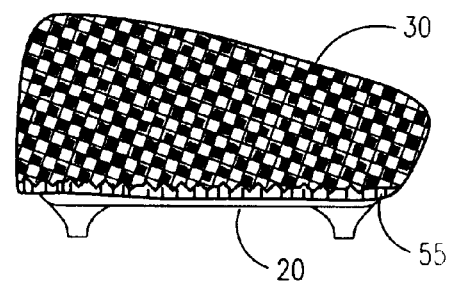
FIG. 8 is side perspective view of the protective and decorative cover for a portable electric grill according to the preferred embodiment of the present invention shown in-use.

Referring now to FIGS. 1–8, a protective and decorative cover 10 is shown, according to the present invention, designed for use with a conventional GEORGE FOREMAN™ grilling machine 20 and the like. The present invention comprises a main body 30, constructed of a flame retardant material and dimensionally-sized so as to fit over and cover in a conforming manner the contour of a GEORGE FOREMAN™ grilling machine 20. For purposes of this disclosure, it is envisioned that the present invention as heretofore and henceforth described, is available in various sizes so as to dimensionally accommodate and be adaptable for use with the various models of GEORGE FOREMAN™ grilling machines 20 manufactured and distributed by Salton, Inc. of Prospect, Ill.

Available in a variety of colors and decorative patterns 40, the main body 30 provides an effective, low cost method by which one can customize his or her GEORGE FOREMAN™ grilling machine 20. The main body 30 has an anterior end 32 opposite a posterior end 33 and includes a generally flat, circular upper surface 34 having a downwardly extending, peripheral side wall 36 which tapers from the posterior end 33 to the anterior 32 end.

A main body retention means 55 is attached at the furthermost lateral ends of the peripheral side wall 36 excluding a tail portion 31 thereof, so as to form a generally enclosed structure. For purposes of this disclosure, the main body retention means 55 is depicted as an elastic band 56. The elastic band 56 functions to stretch to fit over and contracts to fit the contour of the GEORGE FOREMAN™ grilling machine 20.

Interfacing 70 is secured circumferentially to an inner face 35 of the upper surface 34 and to inner corners 37 of the main body 30 so as to make the overall structure slightly stiffer, and thus holding its overall shape.

When properly fitted, the protective and decorative cover 10 resembles an English cap or similar headgear of like characteristics.

It is envisioned that the main body 30 is washable. It is also envisioned that a reflective coating 72 is located on the main body 30, thus permitting the present invention to be used by construction workers and the like, for safety purposes, as is required by applicable state and federal regulations.

Figure 9:
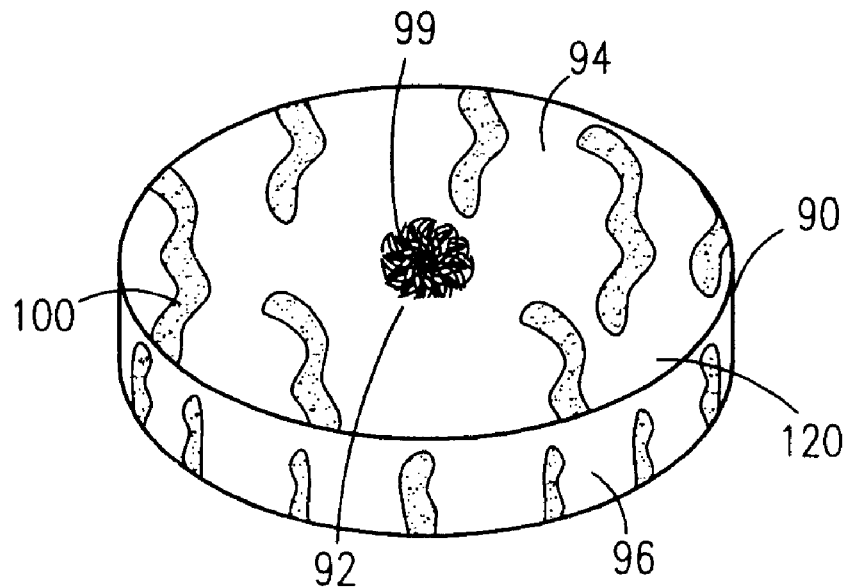
FIG. 9 is a perspective view of the alternate embodiment of the present invention.
Figure 10:
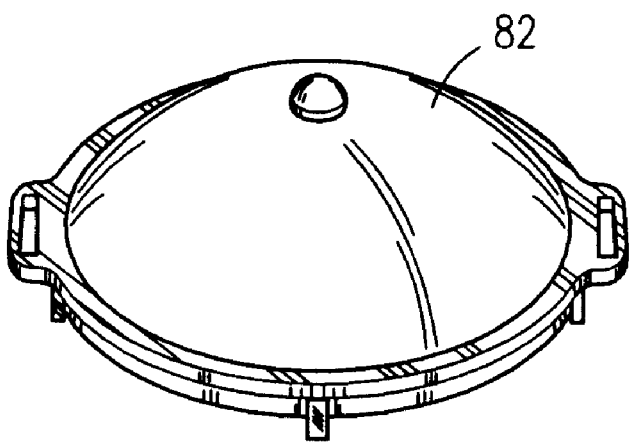
FIG. 10 is a perspective view of the fusion grill.
Figure 11:
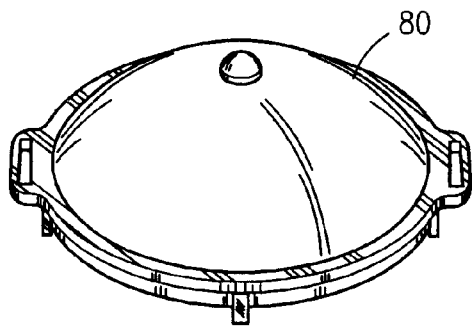
FIG. 11 is a perspective view of the party grill.
Figure 12:
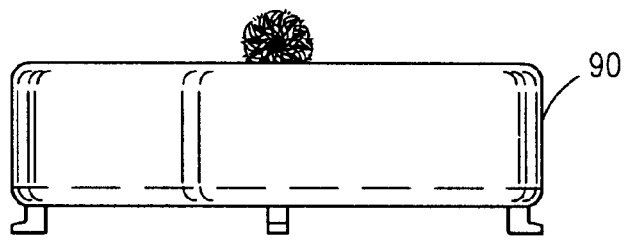
FIG. 12 is a side perspective view of the alternate embodiment shown in-use.
Figure 13:
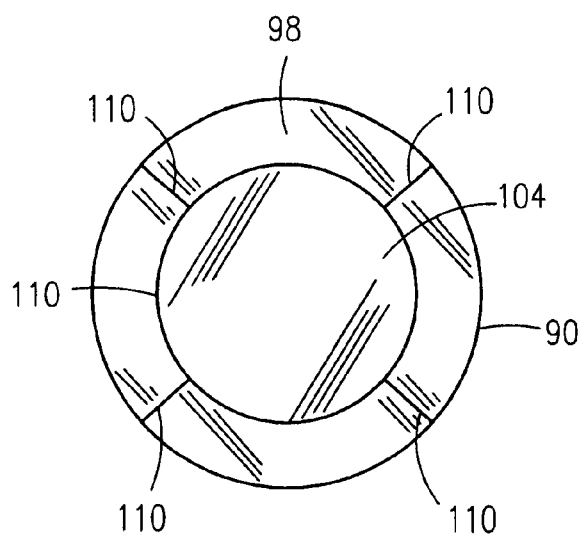
FIG. 13 is a bottom plan view of the alternate embodiment of the present invention.

Referring now to FIGS. 9–13, an alternate embodiment of the present invention is provided which includes a generally circular main body 90, constructed of a flame retardant material and dimensionally-sized so as to fit over and cover in a conforming manner the contour of a GEORGE FOREMAN™ party grill 80 and GEORGE FOREMAN™ fusion grill 82. It is envisioned that the main body 90 is available in a variety of colors and decorative patterns 100. The main body 90 includes a generally flat, circular upper surface 94 having a downwardly extending, peripheral side wall 96. A ball-shaped tassel 99 is sewn to the symmetrical center 92 of the upper surface 94 to accentuate the appearance of a beanie or comparable cap worn on the head.

Interfacing 110 is secured circumferentially to an inner face 104 of the upper surface 94 and to an inner wall 98 of the peripheral side wall 96 of the main body 90 at spaced locations. The interfacing 110 serves to make the overall structure slightly stiffer so as to hold its overall shape.

When properly fitted, the alternate embodiment resembles a beanie or similar headgear of like characteristics.

It is envisioned that the main body 90 is washable. It is also envisioned that a reflective coating 120 is located on the main body 90, thus permitting the alternate embodiment to be used by construction workers and the like, for safety purposes, as is required by applicable state and federal regulations.

2. Operation of the Preferred Embodiment

To use the present invention, the user extends the peripheral side wall 36 about an outer peripheral surface of the GEORGE FOREMAN™ grilling machine 20 and fits the main body 30 thereover. Once properly fitted, the present invention resembles an English cap or similar headgear of like characteristics.

The use of the present invention allows one to cover up a conventional GEORGE FOREMAN™ grilling machine to make a fashion statement.

As designed, a device embodying the teachings of the present invention is easily applied. The foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be broadly limited only by the following Claims.

What is claimed is:

1. A protective and decorative cover comprising:

a main body, said main body is constructed of a flame retardant material and dimensionally-sized so as to fit over and cover in a conforming manner a contour of a GEORGE FOREMAN™ grilling machine, whereupon being properly fitted, said main body resembles an English cap or similar headgear of like characteristics, wherein said main body has an anterior end opposite a posterior end, and said main body includes a generally flat, circular upper surface having a downwardly extending, peripheral side wall, wherein said peripheral side wall tapers from said posterior end to said anterior end;

a main body retention means, said main body retention means is attached at furthermost lateral ends of said peripheral side wall excluding a tail portion of said peripheral side wall, so as to form a generally enclosed structure, said main body retention means functions to stretch to fit over and contracts to fit the contour of the GEORGE FOREMAN™ grilling machine; and an interfacing, said interfacing is secured circumferentially to an inner face of said upper surface and to inner corners of said main body, said interfacing functions to make said main body slightly stiffer, thereby allowing said main body to hold an overall shape of said main body.

2. The protective and decorative cover of claim 1, wherein said main body is available in a variety of colors and decorative patterns.

3. The protective and decorative cover of claim 1, wherein said main body is washable and has a reflective coating overlaid thereon.

4. The protective and decorative cover of claim 1, wherein said main body retention means is defined as an elastic band.

5. A protective and decorative cover comprising:

a main body, said main body is of a generally circular configuration, constructed of a flame retardant material and dimensionally-sized so as to fit over and cover in a conforming manner a contour of a GEORGE FOREMAN™ party grill and a GEORGE FOREMAN™ fusion grill, wherein said main body includes a generally flat, circular upper surface having a downwardly extending, peripheral side wall; and an interfacing, said interfacing is secured circumferentially to an inner face of said upper surface of said main body and to an inner wall of said peripheral side wall of said main body at spaced locations, said interfacing functions to make said main body slightly stiffer, thereby allowing said main body to hold an overall shape of said main body.

6. The protective and decorative cover of claim 5, wherein said main body is washable and has a reflective coating overlaid thereon.

7. The protective and decorative cover of claim 5, wherein said upper surface has a ball-shaped tassel sewn to a symmetrical center of said upper surface in order to accentuate an appearance of a beanie or comparable cap worn on one's head.

8. The protective and decorative cover of claim 5, wherein said main body is available in a variety of colors and decorative patterns.

* * * * *